US010001932B2

United States Patent
Hess et al.

(10) Patent No.: US 10,001,932 B2
(45) Date of Patent: Jun. 19, 2018

(54) ENHANCED REDUNDANT CACHING FOR SHINGLED MAGNETIC RECORDING DEVICES IN DATA STORAGE DRIVE ASSEMBLIES

(71) Applicant: HGST Netherlands B.V., Amsterdam (NL)

(72) Inventors: Randall L. Hess, Colorado Springs, CO (US); Berck E. Nash, Divide, CO (US); James M. Reiser, Colorado Springs, CO (US); Randy L. Roberson, Lutz, FL (US); Kris B. Stokes, Colorado Springs, CO (US); Jesse L. Yandell, Colorado Springs, CO (US)

(73) Assignee: Western Digital Technologies, Inc., San Jose, CA (US)

( * ) Notice: Subject to any disclaimer, the term of this patent is extended or adjusted under 35 U.S.C. 154(b) by 50 days.

(21) Appl. No.: 14/734,574

(22) Filed: Jun. 9, 2015

(65) Prior Publication Data
US 2016/0364157 A1    Dec. 15, 2016

(51) Int. Cl.
*G06F 3/06*    (2006.01)

(52) U.S. Cl.
CPC ............ *G06F 3/0619* (2013.01); *G06F 3/061* (2013.01); *G06F 3/065* (2013.01); *G06F 3/0647* (2013.01); *G06F 3/0665* (2013.01); *G06F 3/0685* (2013.01)

(58) Field of Classification Search
CPC ...... G06F 3/0619; G06F 3/0647; G06F 3/065; G06F 3/0665; G06F 3/0685; G06F 3/061
See application file for complete search history.

(56) References Cited

U.S. PATENT DOCUMENTS

| | | | |
|---|---|---|---|
| 6,243,795 B1 * | 6/2001 | Yang .................... | G06F 11/1666 |
| | | | 160/113 |
| 7,051,156 B2 | 5/2006 | Shang | |
| 8,074,017 B2 | 12/2011 | Cavallo | |
| 8,074,112 B1 | 12/2011 | Chang et al. | |
| 8,291,153 B2 | 10/2012 | Berke et al. | |
| 8,909,859 B2 | 12/2014 | Bandic et al. | |
| 9,250,811 B1 * | 2/2016 | Patiejunas ............... | G06F 3/061 |
| 9,269,376 B1 * | 2/2016 | Hess ....................... | G11B 5/012 |
| 9,417,814 B1 * | 8/2016 | Hall ....................... | G06F 3/0653 |
| 2003/0126497 A1 * | 7/2003 | Kapulka ............. | G06F 11/0709 |
| | | | 714/6.13 |

(Continued)

OTHER PUBLICATIONS

Jin et al. "HiSMRfs: a High Performance File System for Shingled Storage Array." In Mass Storage Systems and Technologies (MSST), 2014 30th Symposium on, pp. 1-6. IEEE, 2014.

*Primary Examiner* — Arpan P. Savla

(57) ABSTRACT

A data storage array is presented that includes a plurality of storage drives each comprising storage media with a first storage region and a shingled magnetic recording (SMR) storage region. The data storage array includes a control system communicatively coupled to the storage drives and configured to receive a write operation over a host interface for storage of write data by the data storage array. Responsive to the write operation, the control system is configured to cache the write data in first storage regions of two or more of the storage drives prior to transfer of the write data into at least an SMR storage region of a storage drive associated with the write operation.

20 Claims, 4 Drawing Sheets

(56) References Cited

U.S. PATENT DOCUMENTS

| | | | |
|---|---|---|---|
| 2004/0267902 A1* | 12/2004 | Yang | H04L 69/16 709/217 |
| 2012/0110113 A1* | 5/2012 | Lee | H04L 67/2852 709/214 |
| 2014/0019680 A1 | 1/2014 | Jin et al. | |
| 2014/0055881 A1* | 2/2014 | Zaharris | G11B 5/012 360/55 |
| 2014/0143488 A1* | 5/2014 | Snaman, Jr. | G06F 3/0607 711/114 |
| 2015/0135005 A1* | 5/2015 | Hsu-Hung | G06F 11/1096 714/6.24 |
| 2015/0169460 A1* | 6/2015 | Zaw | G06F 12/0866 711/113 |
| 2015/0378621 A1* | 12/2015 | Bruner | G06F 3/0619 711/114 |
| 2016/0062651 A1* | 3/2016 | Hineman | G06F 3/061 711/114 |

* cited by examiner

ENHANCED REDUNDANT CACHING FOR SHINGLED MAGNETIC RECORDING DEVICES IN DATA STORAGE DRIVE ASSEMBLIES

TECHNICAL FIELD

Aspects of the disclosure are related to the field of data storage and hard disk drive arrays in data storage systems.

TECHNICAL BACKGROUND

Computer and network systems such as personal computers, workstations, server systems, and cloud storage systems, typically include data storage elements for storing and retrieving data. These data storage elements can include data storage devices, such as hard disk drives, solid state storage devices, hybrid storage devices, tape storage devices, and other mass storage devices.

Magnetic storage drives, such as hard disk drives, can employ various magnetic storage technologies. One such storage technology includes data storage drives with shingled magnetic recording (SMR) technology to increase storage densities on associate storage media. SMR technology physically overlaps adjacent data tracks on a magnetic storage media, in contrast to a non-overlapping track recording technology, such as parallel magnetic recording (PMR) or other non-SMR techniques.

As computer systems and networks grow in numbers and capability, there is a need for more and more storage capacity. Cloud computing and large-scale data processing systems have further increased the need for digital data storage systems capable of transferring and holding immense amounts of data. Data centers can include a large quantity of data storage devices in various rack-mounted and high-density storage configurations. These data storage devices can also be combined into high capacity arrays of storage drives. However, maintaining statistical failure rates while providing data redundancy in these high-density arrays can be difficult.

Overview

To provide enhanced operation of data storage devices and systems, various systems, apparatuses, methods, and software are provided herein. In a first example, a data storage array is presented that includes a plurality of storage drives each comprising storage media with a first storage region and a shingled magnetic recording (SMR) storage region. The data storage array includes a control system communicatively coupled to the storage drives and configured to receive a write operation over a host interface for storage of write data by the data storage array. Responsive to the write operation, the control system is configured to cache the write data in first storage regions of two or more of the storage drives prior to transfer of the write data into at least an SMR storage region of a storage drive associated with the write operation.

In another example, a method of operating a data storage array is presented. The method includes storing data in a plurality of storage drives each comprising storage media with a first storage region and a shingled magnetic recording (SMR) storage region. The method includes receiving a write operation over a host interface for storage of write data by the data storage array. Responsive to the write operation, the method includes caching the write data in first storage regions of two or more of the storage drives prior to transfer of the write data into at least an SMR storage region of a storage drive indicated by the write operation.

In another example, a data storage assembly is presented. The data storage assembly includes a plurality of hard disk drives (HDDs) each comprising rotating magnetic storage media with a cache storage region and a shingled magnetic recording (SMR) storage region. The data storage assembly includes an enclosure comprising structural elements to mount the plurality of HDDs and at least one external connector for communicatively coupling a control system of the data storage assembly over a host link. The control system is communicatively coupled to the HDDs and configured to receive storage operations over the host link for storage and retrieval of data by the HDDs. Responsive to write operations among the storage operations, the control system is configured to redundantly transfer write data for storage in associated cache storage regions of two or more of the HDDs prior to committing the write data into an SMR storage region of at least one of the HDDs.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

High-density magnetic storage devices employ a variety of storage technologies. One such storage technology includes rotating data storage drives with shingled magnetic recording (SMR) technology. SMR technology allows for read/write heads to physically overlap adjacent data tracks on the storage media, in contrast to a non-overlapping recording technology, such as parallel magnetic recording (PMR) or a non-overlapping version of SMR, among others. Since SMR technology has closely-spaced data tracks on the storage media, sequential or burst write operations are preferred instead of random write operations. This sequential or burst write operation can prevent unwanted corruption of already-written data on adjacent tracks of the data storage drive. To assist in performing sequential or burst write operations, a caching mechanism can be employed to first accumulate a threshold amount of write operations before a burst write of data to the associated SMR portions of the data storage drives. However, when many of these data storage drives are included in an array of drives, the caching can be subject to drive failure and reduced reliability. In the examples herein, enhanced reliability is provided in storage drive arrays using redundancy in array caching mechanisms.

Figure 1:
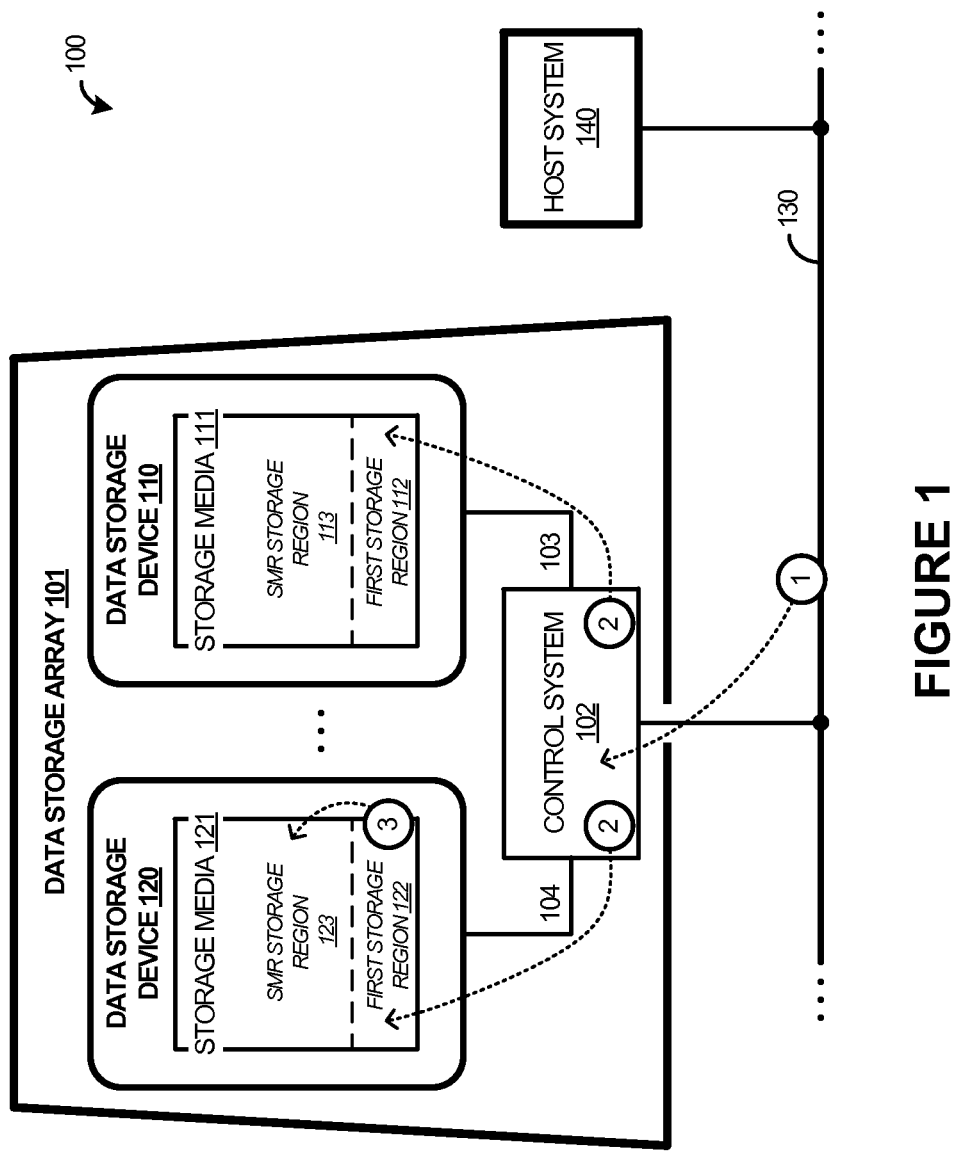
FIG. 1 is a system diagram illustrating a data system.

In a first example of a data storage array with cache redundancy, FIG. 1 is presented. FIG. 1 is a system diagram illustrating data system 100. System 100 includes data storage array 101 and host system 140. Data storage array 101 and host system 140 communicate over storage link 130. Data storage array 101 includes data storage elements comprising one or more data storage devices and one or more control systems. In FIG. 1, data storage array 101 includes control system 102, data storage device 110, and data storage device 120. Control system 102 communicates with data storage device 110 over storage link 103. Control system 102 communicates with data storage device 120 over storage link 104.

In operation, data storage array 101 receives read or write transactions over storage link 130 issued by host system 140. Responsive to read transactions, data storage array 101 can retrieve data stored upon any of the included data storage devices for transfer to host system 140. Responsive to write transactions, data storage array 101 stores data in at least one of the included data storage devices. It should be understood that other components of data storage array 101 are omitted for clarity in FIG. 1, such as cache systems, chassis, enclosures, fans, interconnect, and each individual data storage device can also include read/write heads, armatures, preamps, transceivers, processors, amplifiers, motors, servos, enclosures, and other electrical and mechanical elements.

Figure 2:
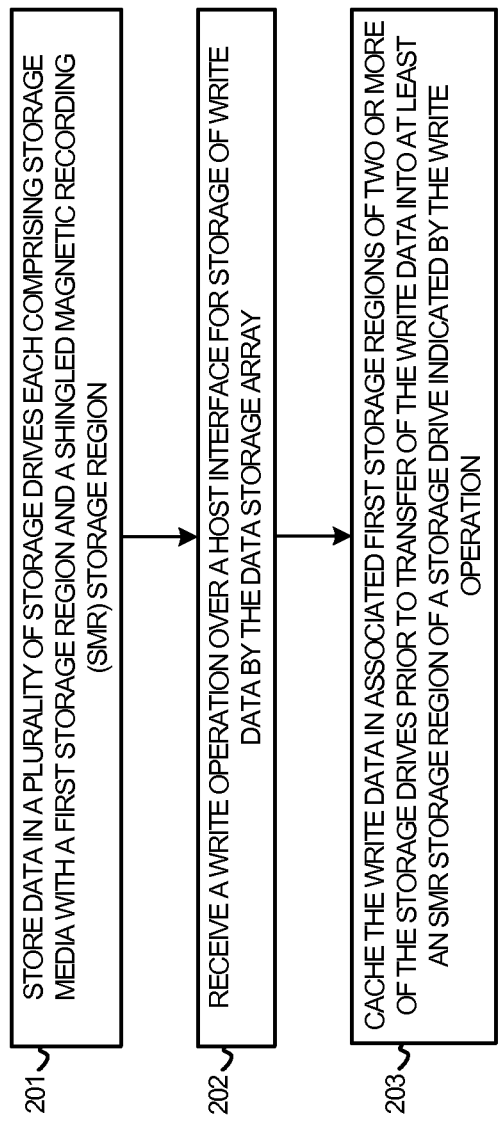
FIG. 2 is a flow diagram illustrating a method of operation of a data storage system.

To further illustrate the operation of data system 100, FIG. 2 is provided. FIG. 2 is a flow diagram illustrating a method of operating data storage array 101. The operations of FIG. 2 are referenced below parenthetically. In FIG. 2, data storage array 101 stores (201) data in a plurality of storage drives each comprising storage media with a first storage region and a SMR storage region. Data storage device 110 includes storage media 111 with first storage region 112 and SMR storage region 113. Data storage device 120 includes storage media 121 with first storage region 122 and SMR storage region 123.

First storage regions 112 and 122 can comprise PMR storage regions, or other non-SMR storage regions on the same associated rotating storage media. Some examples of the storage media comprise overlapping track SMR recording for the SMR storage region and a non-overlapping track SMR recording for the first storage regions or cache regions. The non-overlapping type of SMR storage regions can comprise a random read-write region, which uses a widely-spaced SMR technique so that random read/writes are possible and adjacent tracks do not overlap as in SMR techniques. In some examples, first storage regions 112 and 122 are included in other storage media, such as solid state storage media.

The data is stored responsive to various storage operations, such as write operations received by data storage array over storage link 130. Data storage array 101 receives storage operations transferred by host system 140 that comprise write operations for storage of write data on a storage media and read operations for retrieval of data already stored on the storage media. In this example, the storage operations are received by control system 102 over storage link 130. Although these storage operations can comprise read operations or write operations, in the examples in FIG. 2 only write operations are discussed for clarity. In a specific example, data storage array 101 receives (202) a write operation over a host interface for storage of write data by data storage array 101. The host interface is coupled to storage link 130, and receives this write operation as indicated by operation '1' in FIG. 1.

Data storage array 101 caches (203) the write data in associated first storage regions of two or more of the storage drives prior to transfer of the write data into at least an SMR storage region of a storage drive associated with the write operation. Control system 102 transfers the write data associated with the write operation received in operation '1' to both data storage device 110 and data storage device 120, as indicated by operation '2' in FIG. 1. Specifically, control system 102 transfers a first copy of the write data into first storage region 112 of storage media 111 and a second copy of the write data into first storage region 122 of storage media 121. The caching of the write data in both data storage device 110 and data storage device 120 allows for redundancy in the caching in the event that any of the data storage devices fails or otherwise cannot provide the write data at a later time from the associated first storage region.

At a later time, such as once enough write data has been accumulated by data storage array 101, then this cached write data can be transferred into an appropriate SMR region of a data storage device of data storage array 101. The write data can be cached in first storage regions that reside in different data storage devices than the SMR regions to which the write data is eventually transferred. As a specific example, although the write data is cached in first storage region 112 of data storage device 110 and first storage region 122 of data storage device 120, only SMR storage region 123 of data storage device 120 stores the write data after the commit process is performed as indicated by operation '3' in FIG. 1. It should be understood that more than one SMR region can be employed to store the committed write data, such as in mirroring, striping, or other redundancy techniques.

The particular SMR storage region of a data storage device to which the write data is committed can be determined by control system 102. In some examples, control system 102 will establish one or more logical partitions or subdivisions of the total storage space of data storage array 101. Write operations can be directed to any of the logical partitions associated with the write operation, and indicate a storage address, logical unit, partition, or other indication which designates logical blocks that in data storage array 101 that write data associated with a write operation is directed. However, before the write data is stored in the location designated by the write operation, the write data is cached in first storage regions of a redundant set of data storage drives. As discussed herein, the first storage regions can comprise non-SMR storage regions which use a non-SMR storage technique for storing data therein.

The first storage regions discussed in FIG. 1 typically employ a faster write scheme than the SMR regions, such as PMR mentioned above. Since the SMR regions are more suited to have large bursts of write data written consecutively, the first storage regions can be used as a cache before commit of the write data into the SMR regions. Advantageously, when redundant caching of the write data into the first storage regions is employed prior to commit of the write data to the SMR regions, failures of any of the data storage devices used to cache the write data can be masked. If, for example, first storage region 122 of data storage device 120 fails, then the write data can be retrieved from first storage region 112 of data storage device 110 when the commit process occurs to move the write data into an appropriate SMR region. Mean time between failure (MTBF) characteristics of data storage array 101 can be maintained below predetermined levels due in part to the redundant caching in more than one first storage region prior to commit in an SMR region.

The particular SMR region of a particular data storage device which is used for ultimate storage of the write data can be determined based on many factors. For example, the write address associated with the write data can determine where the write data should be stored after the caching process. Various logical and physical storage partitions or logical units can be established which hold write data associated with various hosts, applications, or other data sources. Control system 102 can determine a storage location for any write data received over storage link 130, and can temporality store the write data in two or more first storage regions prior to final storage or archival of the data into the storage location. These final storage locations are typically in one or more SMR regions and are identified by one or more storage blocks on the associated storage media.

Returning to the elements of FIG. 1, data storage array 101 comprises a plurality of data storage devices, such as data storage drives. These data storage devices are coupled to storage control system 102 by one or more storage links (such as links 103 and 104), which can comprise a serial ATA interface, Serial Attached Small Computer System (SAS) interface, Integrated Drive Electronics (IDE) interface, ATA interface, Peripheral Component Interconnect Express (PCIe) interface, Universal Serial Bus (USB) interface, wireless interface, Direct Media Interface (DMI), Ethernet interface, networking interface, or other communication and data interface, including combinations, variations, and improvements thereof. Data storage array 101 can also comprise cache systems, chassis, enclosures, fans, interconnect, cabling, or other circuitry and equipment.

Storage control system 102 includes processing circuitry, communication interfaces, and one or more non-transitory computer-readable storage devices. The processing circuitry can comprise one or more microprocessors and other circuitry that retrieves and executes firmware from memory for operating as discussed herein. The processing circuitry can be implemented within a single processing device but can also be distributed across multiple processing devices or sub-systems that cooperate in executing program instructions. Examples of the processing circuitry include general purpose central processing units, application specific processors, and logic devices, as well as any other type of processing device, combinations, or variations thereof. The communication interfaces can include one or more storage interfaces for communicating with host systems, networks, and the like. The communication systems can include transceivers, interface circuitry, connectors, buffers, microcontrollers, and other interface equipment.

Data storage device 110 includes one or more computer readable storage media 111 accessible via one or more read/write heads and associated electromechanical elements. Data storage device 110 also includes processing circuitry, communication interfaces, armatures, preamps, transceivers, processors, amplifiers, motors, servos, enclosures, and other electrical and mechanical elements. Data storage device 110 can comprise a hard disk drive, hybrid disk drive, or other computer readable storage device. Data storage device 110 can include further elements, such as those discussed for hard disk drives 320-325 in FIG. 3, although variations are possible. The computer readable storage media of data storage device 110 can include rotating magnetic storage media, but can additionally include other media, such as solid state caches or cache systems of data storage device 110. These other media can include solid state storage media, optical storage media, non-rotating magnetic media, phase change magnetic media, spin-based storage media, or other storage media, including combinations, variations, and improvements thereof. In some examples, data storage device 110 comprises a hybrid hard drive employing solid state storage elements in addition to rotating magnetic storage media. Storage media 113 can employ various magnetic storage schemes, such as shingled magnetic recording (SMR), non-shingled magnetic recording, perpendicular magnetic recording (PMR), including combinations, variations, and improvements thereof. Data storage drive 120 can include similar elements as discussed for data storage drive 110, although variations are possible.

Host system 140 can include processing elements, data transfer elements, and user interface elements. In some examples host system 140 is a central processing unit of a computing device or computing system. In other examples, host system 140 also includes memory elements, data storage and transfer elements, controller elements, logic elements, firmware, execution elements, and other processing system components. In yet other examples, host system 140 comprises a RAID controller processor or storage system central processor, such as a microprocessor, microcontroller, Field Programmable Gate Array (FPGA), or other processing and logic device, including combinations thereof. Host system 140 can include, or interface with, user interface elements which can allow a user of data storage system 100 to control the operations of data storage system 100 or to monitor the status or operations of data storage system 100. These user interface elements can include graphical or text displays, indicator lights, network interfaces, web interfaces, software interfaces, user input devices, or other user interface elements. Host system 140 can also include interface circuitry and elements for handling communications over bus 130, such as logic, processing portions, buffers, transceivers, and the like.

Bus 130 can include one or more serial or parallel data links, such as a Peripheral Component Interconnect Express (PCIe) interface, serial ATA interface, Serial Attached Small Computer System (SAS) interface, Integrated Drive Electronics (IDE) interface, ATA interface, Universal Serial Bus (USB) interface, wireless interface, Direct Media Interface (DMI), Ethernet interface, networking interface, or other communication and data interface, including combinations, variations, and improvements thereof. Although one bus 130 is shown in FIG. 1, it should be understood that one or more discrete links can be employed between the elements of data storage system 100.

Figure 3:
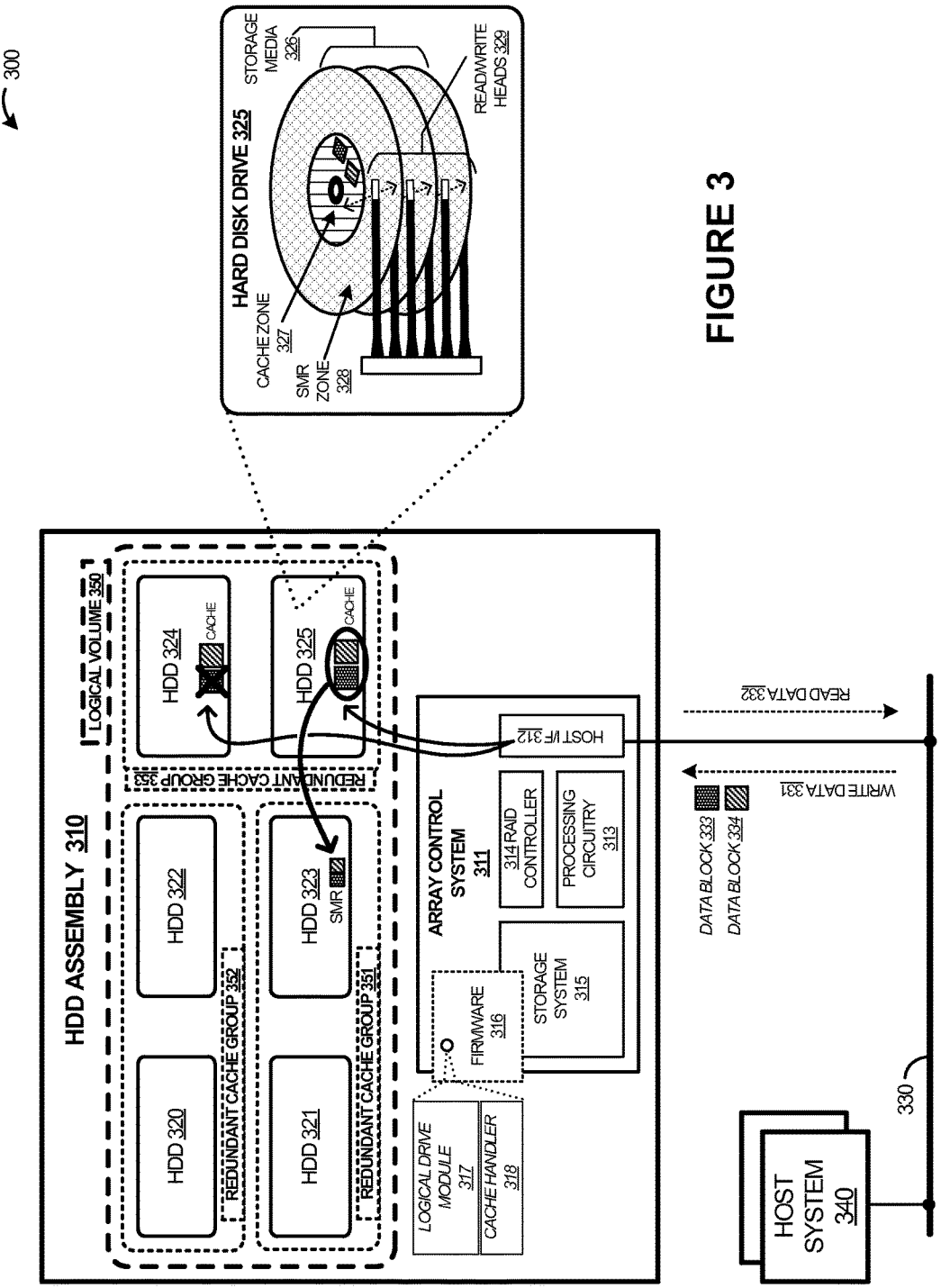
FIG. 3 is a system diagram illustrating a data system.

As a further example data storage system employing a data storage array, FIG. 3 is presented. FIG. 3 is a system diagram illustrating data storage system 300. Data storage system 300 includes hard disk drive (HDD) assembly 310 and host system 340. HDD assembly 310 and host system 340 communicate over storage link 330. Various elements of HDD assembly 310 can be included in data storage array 101 of FIG. 1, although variations are possible. Although one HDD assembly 310 is shown in FIG. 3, it should be understood that more than one HDD assembly could be included and linked to host system 340 or other host systems, such as in a data storage environment employing many hard disk drives in an array.

HDD assembly 310 can comprise a storage assembly with associated enclosure and structural elements which is insertable into a rack that can hold other HDD assemblies, such a rackmount server environment. The enclosure can include structural elements to mount the plurality of HDDs and can also include at least one external connector for communicatively coupling array control system 311 or host interface 312 of HDD assembly 310 over storage link 330.

HDD assembly 310 can comprise a JBOD device, or "Just a Bunch Of Disks" device which include a plurality of independent disks which can be spanned and presented as one or more logical drives to host system 340. In some examples, HDD assembly 310 comprises a virtual box of disks (VBOD). A VBOD employs SMR hard disk drives in an array. However, SMR disks typically have inefficiencies for random writes due to the shingled nature of adjacent tracks for data. The VBOD abstracts the SMR drives and allows random writes and random reads while still having underlying SMR drives which ultimately hold the associated data. In the examples herein, although SMR drives are employed, write data is first cached in one or more other non-SMR regions prior to archival in the associated SMR regions.

Storage link 330 can include one or more links, although a single link is shown in FIG. 3. Storage link 330 can comprise a storage or disk interface, such as Serial Attached ATA (SATA), Serial Attached SCSI (SAS), FibreChannel, Universal Serial Bus (USB), SCSI, InfiniBand, Peripheral Component Interconnect Express (PCIe), Ethernet, Internet Protocol (IP), or other parallel or serial storage or peripheral interfaces, including variations and combinations thereof.

Host system 340 can include one or more computing and network systems, such as personal computers, servers, cloud storage systems, packet networks, management systems, or other computer and network systems, including combinations and variations thereof. In operation, host system 340 issues read and write commands or operations to HDD assembly 310 over storage link 330, among other commands or operations which can include control instructions, metadata retrieval operations, configuration instructions, and the like. Likewise, HDD assembly 310 can transfer read data over storage link 330, among other information such as graphical user interface information, status information, operational information, failure notifications, alerts, and the like.

HDD assembly 310 includes a plurality of hard disk drives (HDDs), namely six HDDs 320-325, although any number of HDDs can be included. Each HDD 320-325 is coupled to array control system 311 by one or more links, which in this example comprises Serial Attached SCSI (SAS) links, although any link type described for links 103-104 of FIG. 1 can be employed. Each HDD 320-325 can comprise similar elements, and for exemplary purposes, a detailed view of only HDD 325 is shown in FIG. 3, although variations are possible among HDD 320-325. HDD 325 includes storage media 326, R/W heads 329. HDD 325 can include further elements, such as armatures, preamps, transceivers, processors, amplifiers, motors, servos, enclosures, and other electrical and mechanical elements. In FIG. 3, HDD 325 also subdivides storage media 326 into at least two zones, namely cache zone 327 and SMR zone 328.

HDD assembly 310 also includes array control system 311. Array control system 311 includes processing circuitry 313, redundant array of independent disks (RAID) controller 314, storage system 315, and host interface (I/F) 312. Furthermore, array control system 311 includes firmware 316 which includes logical drive module 317 and cache handler 318 which, when executed by at least processing circuitry 313, operates as described below.

Array control system 311 handles storage operations for HDD assembly 310, such as receiving storage operations from host systems over storage link 330 in host interface 312. Write data 331 can be received in one or more write operations, and read data 332 can be provided to hosts responsive to one or more read operations. An interface can be provided to a host system, such as a single (or redundant) Ethernet port, which allows for the host system to access the storage capacity of HDD assembly. Array control system 311 can establish any number of logical volumes or logical storage units across the various HDDs in HDD assembly 310, which can comprise spanning, redundant arrays, striping, or other data storage techniques.

Host interface 312 includes one or more storage interfaces for communicating with host systems, networks, and the like over at least link 330. Host interface 312 can comprise transceivers, interface circuitry, connectors, buffers, microcontrollers, and other interface equipment. Host interface 312 can also include one or more I/O queues which receive storage operations over link 330 and buffers these storage operations for handling by processing circuitry 313.

Array control system 311 also includes processing circuitry 313, RAID controller 314, and storage system 315. Processing circuitry 313 can comprise one or more microprocessors and other circuitry that retrieves and executes firmware 316 from storage system 315. Processing circuitry 313 can be implemented within a single processing device but can also be distributed across multiple processing devices or sub-systems that cooperate in executing program instructions. Examples of processing circuitry 313 include general purpose central processing units, application specific processors, and logic devices, as well as any other type of processing device, combinations, or variations thereof. In some examples, processing circuitry 313 includes a system-on-a-chip device or microprocessor device, such as an Intel Atom processor, MIPS microprocessor, and the like.

RAID controller 314 can include one or more RAID control circuits and processors which can control various data redundancy handling among the various HDDs of HDD assembly 310. RAID controller 314 also includes HDD interfaces, such as SAS interfaces to couple to the various HDDs in HDD assembly 310. In some examples, RAID controller and processing circuitry 313 communicate over a peripheral component interconnect express (PCIe) interface or other communication interfaces.

Storage system 315 can comprise any non-transitory computer readable storage media readable by processing circuitry 313 or RAID controller 314 and capable of storing firmware 316. Storage system 315 can include volatile and nonvolatile, removable and non-removable media implemented in any method or technology for storage of information, such as computer readable instructions, data structures, program modules, or other data. In addition to storage media, in some implementations storage system 315 can also include communication media over which firmware 316 can be communicated. Storage system 315 can be implemented as a single storage device but can also be implemented across multiple storage devices or sub-systems co-located or distributed relative to each other. Storage system 315 can comprise additional elements, such as a controller, capable of communicating with processing circuitry 313. Examples of storage media of storage system 315 include random access memory, read only memory, magnetic disks, optical disks, flash memory, phase change memory, magnetic cassettes, magnetic tape, magnetic disk storage or other magnetic storage devices, or any other medium which can be used to store the desired information and that can be accessed by an instruction execution system, as well as any combination or variation thereof, or any other type of storage media.

Firmware 316, logical drive module 317, and cache handler 318 can be implemented in program instructions and among other functions can, when executed by array control system 311 in general or processing circuitry 313 in particular, direct array control system 311 or processing circuitry 313 to operate as described herein. Firmware 316 can include additional processes, programs, or components, such as operating system software, database software, or application software. Firmware 316, logical drive module 317, and cache handler 318 can also comprise software or some other form of machine-readable processing instructions executable by processing circuitry 313. In at least one implementation, the program instructions can include first program instructions that direct array control system 311 to receive write operations and responsively store write data in a first storage region prior to transferring into a SMR storage region (cache handler 318), determine logical arrangements of the various HDDs for redundancy of cached data and archival of committed data (logical drive module 317), and report completion of the write operations to the host system, and provide read data retrieved from any of the HDDs to the host system, among other operations.

In general, firmware 316 can, when loaded into processing circuitry 313 and executed, transform processing circuitry 313 overall from a general-purpose computing system into a special-purpose computing system customized to operate as described herein. Encoding firmware 316 on storage system 315 can transform the physical structure of storage system 315. The specific transformation of the physical structure can depend on various factors in different implementations of this description. Examples of such factors can include, but are not limited to the technology used to implement the storage media of storage system 315 and whether the computer-storage media are characterized as primary or secondary storage. For example, if the computer-storage media are implemented as semiconductor-based memory, firmware 316 can transform the physical state of the semiconductor memory when the program is encoded therein. For example, firmware 316 can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion.

Figure 4:
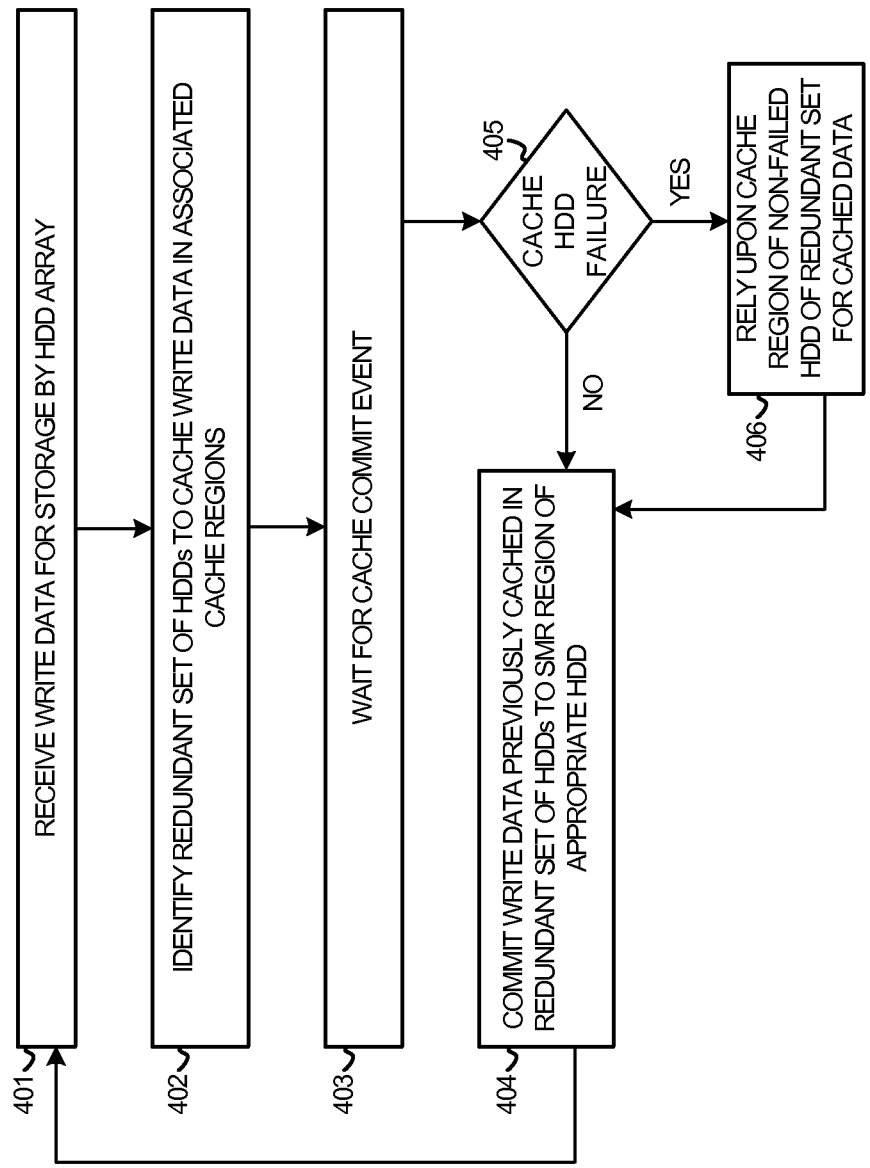
FIG. 4 is a flow diagram illustrating a method of operation of a data storage system.

To further illustrate the operation of system 300 and HDD assembly 310, FIG. 4 is presented. FIG. 4 is a flow diagram illustrating a method of operation of HDD assembly 310. The operations of FIG. 4 are referenced below parenthetically. In FIG. 4, HDD assembly 310 receives (401) write data for storage by HDD assembly 310. This write data is associated with one or more write operations which are received over link 330 from host system 340, such as write data 331 in FIG. 3. Write data 331 can comprise one or more data blocks for storage by HDD assembly 310, such as data blocks 333-334. In other examples, further write data can be received from other write operations, or data blocks 333-334 can comprise data from separate write operations. HDD assembly 310 stores write data 331 for later retrieval by host 340. However, upon receipt of write data 331, HDD assembly 310 caches write data 331 prior to committing write data 331 into at least one SMR region of at least one HDD of HDD assembly 310.

First, a set of more than one HDD of HDD assembly 310 is designated for use as a cache for write data 331. Processing circuitry 313 identifies (402) a redundant set of HDDs to cache write data 331 in associated cache regions. FIG. 3 shows three different sets of HDDs designated as redundant cache groups, namely groups 351-353. As write data is received over link 330, the write data is first cached in cache regions of a selected cache group. A particular group can be designated to cache write data for a particular logical storage unit (LUN) or storage partition. In other examples, pairs of HDDs are used in a mirrored arrangement for caching of write data and all HDDs are included in a single logical volume 350. It should be understood that any number of logical volumes and redundant cache groups can be established to meet redundancy or MTBF targets. For example, any type of RAID array can be established among cache regions of different HDDs which cache write data prior to transfer into one or more SMR regions of HDDs in HDD array 310. Moreover, the SMR regions can also be arranged into a redundant array, such as a mirrored array or striped array.

In this example, write data 331 is mirrored and cached in cache regions of both HDD 324 and 325 which are members of redundant cache group 353. As seen in the detailed view of HDD 325, a portion of storage media 326 is designated as cache zone 327 while another portion of storage media 326 is designated as SMR zone 328. FIG. 3 shows data blocks 333 and 334 being stored in cache regions of both HDD 324 and 325. Further write data and associated data blocks can be received and stored in the cache regions of HDD 324 and 325, or in cache regions of other HDDs.

The mirroring employed in this example can include least-busy pair mirroring. In least-busy pair mirroring, several pairs of HDDs are established for caching of write data, such as the three pairs of HDDs seen in FIG. 3. Whenever data is desired to be cached, array control system 311 can identify which of the pairs of HDDs is least busy, such as any pair which is not currently servicing any write or read operations. Other determinations of a level of activity of each of the redundant pairs of HDDs can be established, such as drives which are not in a powered down or idle state but yet are not currently performing a write or read operation, or such as drives which have associated read/write heads positioned most near to the cache regions of the associated storage media.

Array control system 311 continues to cache write data in associated redundant cache regions of HDD assembly 310 until a cache commit event is reached (403). The cache commit event can comprise HDD assembly 310 receiving a threshold amount of write data, such as a predetermined number of data blocks. The cache commit event can comprise an associated cache region or regions filling with data past a threshold level. The cache commit event can be a time threshold, where after a predetermined amount of time any cached data will be committed. Other cache commit events can be established, including combinations thereof.

Once the cache commit event is reached, then array control system 311 commits (404) write data previously cached in the redundant set of HDDs to an SMR region of an appropriate HDD. As shown in FIG. 3, HDD 323 is used to commit data blocks 333-334, specifically, an SMR region of HDD 323. Although a different HDD than either of HDD 324-325 is used for the commit storage of data blocks 333-334, it should be understood that any of HDD 324-325 could instead have been used. The commit process can be referred to as an archival storage, and data blocks 333-334 can be accompanied by many other data blocks which are burst written into a designated SMR region of a particular HDD, such as HDD 323.

The particular SMR region of a HDD to which the write data is committed can be determined by array control system 311. In some examples, array control system 311 will establish one or more logical partitions or subdivisions of the total storage space of HDD assembly 310. Write operations can be directed to any of the logical partitions, and indicate a storage address, logical unit, partition, or other indication which designates logical blocks that in HDD assembly 310 that write data associated with a write operation is directed. However, before the write data is stored in the location designated by the write operation, the write data is cached (operations 402-403) in cache regions of a redundant set of HDDs.

However, if one of the HDDs that was used to cache write data experiences a failure (405), or if the data stored in the cache region of one of the HDDs experiences a failure or error, then the redundant member of the cache group can be used to retrieve the cached data for commit into an SMR regions. In FIG. 3, HDD 324 experiences a data failure for data block 333 but HDD 325 does not experience any data failure for data block 333. Thus, array control system 311 can rely (406) upon a cache region of a non-failed HDD of the redundant group for the cached data. Specifically, array control system 311 detects the error in HDD 324 and instead relies upon HDD 325 for commit of data blocks 333-334 into the SMR region of HDD 323. In further examples, such as when both HDDs of a pair are available, a least busy one of the HDDs of a mirrored pair is selected to retrieve the data for commit into an SMR region.

In some examples, the write data that is cached is accompanied by error checking and correcting (ECC) or parity bit information in the cache regions. This ECC or parity bit information can be used to attempt to correct for data errors in the write data when read from the caching cache region prior to transfer to the SMR region. If the data fails parity or ECC checks from a first HDD of the redundant set used to cache the write data, then the write data can be instead read from a second HDD of the redundant set used to cache the write data. In some examples, the parity or ECC will allow for correction for single-bit or double-bit errors in the data, and thus any detected error can be compensated for. However, in other examples, the data cached in the cache regions of the redundant pair can be read from all of the caching HDDs in parallel and only one set of the data committed to the appropriate SMR region of a HDD.

Once an error or failure is identified for HDD 324, then array control system 311 can notify host 340 or an operator of HDD assembly 310 of the failure. If the failure occurs due to a hardware error or failure, then HDD 324 might be replaced. If the failure occurs due to a media error, such as a back sector or track, then array control system 324 might mark that particular sector or track as bad and not for use in future cache region caching operations. Data blocks 333-334 can be held in the cache regions of HDD 324-325 until a successful commit completes into the SMR region of the target HDD, namely HDD 323. Once the commit process completes, then data blocks 333-334 can be overwritten with subsequently received write data.

Advantageously, by first caching any write data received over storage link 330 into a redundant set of HDDs, any single-drive failures can be compensated for and MTBF numbers can be maintained at desired levels. Moreover, the write data is cached into cache regions of SMR HDDs in this example. Typically, recording techniques employed for the cache region, such as PMR or other non-SMR, are much faster for random writes than SMR recording techniques. Random writes comprise write operations to non-sequential storage locations. These random writes using SMR recording techniques can result in unwanted read-modify-write operations or rewrites which can slow down operation of HDD assembly 310. In the examples herein, a fast redundant caching technique is employed which not only allows for efficient handling of random writes but also adds redundancy to mask single-drive errors or failures for drives that cache the write data.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A data storage array, comprising:
   a plurality of storage drives each comprising storage media having a first storage region and a shingled magnetic recording (SMR) storage region; and
   a control system communicatively coupled to the plurality of storage drives and configured to:
     establish one or more cache groups among the plurality of storage drives comprising redundant sets of the storage drives;
     receive write operations over a host interface for storage of write data by the data storage array, wherein the write operations are directed to storage locations associated with at least an SMR storage region of a target storage drive;
     for each of the write operations, select a least-busy cache group from among the one or more cache groups not presently servicing storage operations;
     cache the write data in associated first storage regions of redundant storage drives in the least-busy cache group prior to commit of the write data into at least the SMR storage region of the target storage drive;
     responsive to a cache commit event, perform a sequential burst transfer of the write data from selected first storage regions of the one or more cache groups into at least the SMR storage region of the target storage drive;
     detect errors during the sequential burst transfer from the selected first storage regions; and
     responsively select redundant first storage regions to retrieve the write data for transfer into at least the SMR storage region.

2. The data storage array of claim 1, wherein the control system is further configured to:
   monitor activity levels among the one or more cache groups; and
   determine the least-busy cache group for each of the write operations based at least in part on the activity levels indicating at least one of the one or more cache groups having associated storage drives not presently servicing read operations or write operations.

3. The data storage array of claim 1, wherein the control system is further configured to establish data redundancy for caching the write data across the first storage regions of each selected least-busy cache group by at least forming a redundant array of independent disks (RAID) arrangement among the first storage regions of each selected least-busy cache group.

4. The data storage array of claim 1, wherein the control system is further configured to:
   detect the errors during the sequential burst transfer by at least identifying that at least a portion of the write data cached in a first one of the first storage regions of an associated cache group has experienced an error; and
   responsively use a second one of the first storage regions of the associated cache group to retrieve the write data during the sequential burst transfer into the SMR storage region.

5. The data storage array of claim 1, wherein the control system is further configured to:
   detect the errors during the sequential burst transfer by at least identifying that a first one of the storage drives of an associated cache group has experienced a failure; and
   responsively use a second one of the storage drives of the associated cache group to retrieve the write data during the sequential burst transfer into the SMR storage region.

6. The data storage array of claim 1, wherein:
   the write operations are directed to the storage locations that correspond to at least the target storage drive; and
   the selected least-busy cache groups comprise storage drives that do not comprise the target storage drive.

7. The data storage array of claim 1, wherein:
   the first storage regions each comprise random read-write regions; and
   the SMR storage regions each comprise sequential write regions.

8. A method of operating a data storage array, the method comprising:
   storing data in a plurality of storage drives each comprising storage media having a first storage region and a shingled magnetic recording (SMR) storage region;
   establishing one or more cache groups among the plurality of storage drives comprising redundant sets of the storage drives;
   receiving write operations over a host interface for storage of write data by the data storage array, wherein the write operations are directed to storage locations associated with at least an SMR storage region of a target storage drive;
   for each of the write operations, selecting a least-busy cache group from among the one or more cache groups not presently servicing storage operations;
   caching the write data in associated first storage regions of redundant storage drives in the least-busy cache group prior to commit of the write data into at least the SMR storage region of the target storage drive;
   responsive to a cache commit event, performing a sequential burst transfer of the write data from selected first storage regions of the one or more cache groups into at least the SMR storage region of the target storage drive;
   detecting errors during the sequential burst transfer from the selected first storage regions; and
   responsively selecting redundant first storage regions to retrieve the write data for transfer into at least the SMR storage region.

9. The method of claim 8, further comprising:
   monitoring activity levels among the one or more cache groups; and
   determining the least-busy cache group for each of the write operations based at least in part on the activity levels indicating at least one of the one or more cache groups having associated storage drives not presently servicing read operations or write operations.

10. The method of claim 8, further comprising:
    establishing data redundancy for caching the write data across the first storage regions of each selected least-busy cache group by at least forming a redundant array of independent disks (RAID) arrangement among the first storage regions of each selected least-busy cache group.

11. The method of claim 8, further comprising:
    detecting the errors during the sequential burst transfer by at least determining that at least a portion of the write data cached in a first one of the first storage regions of an associated cache group has experienced an error; and
    responsively using a second one of the first storage regions of the associated cache group to retrieve the write data during the sequential burst transfer into the SMR storage region.

12. The method of claim 8, further comprising:
    detecting the errors during the sequential burst transfer by at least identifying that a first one of the storage drives of an associated cache group has experienced a failure; and
    responsively using a second one of the storage drives of the associated cache group to retrieve the write data during the sequential burst transfer into the SMR storage region.

13. The method of claim 8, wherein:
    the write operations are directed to the storage locations that correspond to at least the target storage drive; and
    the selected least-busy cache groups comprise storage drives that do not comprise the target storage drive.

14. The method of claim 8, wherein:
    the first storage regions each comprise random read-write regions; and
    the SMR storage regions each comprise sequential write regions.

15. A data storage assembly, comprising:
    a plurality of hard disk drives (HDDs) each comprising rotating magnetic storage media having a random read-write cache storage region and a sequential write shingled magnetic recording (SMR) storage region;
    an enclosure comprising structural elements to mount the plurality of HDDs and at least one external connector for communicatively coupling a control system of the data storage assembly over a host link; and
    the control system communicatively coupled to the HDDs and configured to:
       establish a plurality of cache groups among the plurality of HDDs comprising redundant sets of the HDDs;
       receive write operations over the host link for storage of data by the data storage assembly, wherein the write operations are directed to storage locations associated with at least an SMR storage region of a target HDD;
       select least-busy cache groups for the write operations from among the plurality of cache groups not presently servicing storage operations;
       cache write data in associated cache storage regions of redundant HDDs in the least-busy cache groups prior to commit of the write data into at least the SMR storage region of the target HDD;
       responsive to a cache commit event, perform a sequential burst transfer committing the write data from selected cache storage regions of selected least-busy cache groups into the SMR storage region of the target HDD;
       detect errors during the sequential burst transfer; and
       responsive to the errors, select redundant cache storage regions to retrieve the write data for transfer into at least the SMR storage region of the target HDD.

16. The data storage assembly of claim 15, wherein the control system is further configured to:
    monitor HDD activity levels among the plurality of cache groups; and
    determine the least-busy cache group for each of the write operations based at least in part on the activity levels indicating at least one of the plurality of cache groups having associated HDDs not presently servicing read operations or write operations.

17. The data storage assembly of claim 15, wherein the cache commit event comprises at least one of a threshold amount of the write operations received, a cache level filling past a threshold level, and a predetermined amount of time reached after caching the write data.

18. The data storage assembly of claim 15, wherein the control system is further configured to:
  detect the errors during the sequential burst transfer by at least identifying that at least a portion of the write data cached in a first one of the cache storage regions of an associated cache group has experienced an error; and
  responsively use a second one of the cache storage regions of the associated cache group to retrieve the write data during the sequential burst transfer into the SMR storage region.

19. The data storage assembly of claim 15, wherein the control system is further configured to:
  detect the errors during the sequential burst transfer by at least identifying that a first HDD of an associated cache group has experienced a failure; and
  responsively use a second HDD of the associated group to retrieve the write data during the sequential burst transfer into the SMR storage region.

20. The data storage assembly of claim 15, wherein the selected least-busy cache groups comprise HDDs that do not comprise the target HDD.

* * * * *